US007653359B2

(12) United States Patent
Darabi

(10) Patent No.: US 7,653,359 B2
(45) Date of Patent: Jan. 26, 2010

(54) TECHNIQUES TO DECREASE FRACTIONAL SPURS FOR WIRELESS TRANSCEIVERS

(75) Inventor: Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 621 days.

(21) Appl. No.: 11/336,716

(22) Filed: Jan. 20, 2006

(65) Prior Publication Data

US 2007/0173207 A1 Jul. 26, 2007

(51) Int. Cl.
 *H04B 1/40* (2006.01)
(52) U.S. Cl. .................. 455/76; 455/118; 455/78; 455/84; 455/260; 455/258; 455/255; 331/16; 331/11; 331/34; 327/157; 375/376
(58) Field of Classification Search ............... 455/76, 455/260, 118, 258, 255, 256, 78; 331/16, 331/1 A, 11, 34, 18
 See application file for complete search history.

(56) References Cited

U.S. PATENT DOCUMENTS

| 5,241,702 | A | 8/1993 | Dent |
| 6,308,049 | B1 | 10/2001 | Bellaouar et al. |
| 6,404,293 | B1 | 6/2002 | Darabi et al. |
| 6,553,089 | B2 | 4/2003 | Huh et al. |
| 6,845,232 | B2 | 1/2005 | Darabi |
| 6,862,438 | B2 | 3/2005 | Darabi |
| 6,931,267 | B2 | 8/2005 | Darabi |
| 6,961,552 | B2 | 11/2005 | Darabi et al. |
| 6,968,019 | B2 | 11/2005 | Darabi et al. |
| 6,970,681 | B2 | 11/2005 | Darabi et al. |
| 7,145,402 | B2* | 12/2006 | Mattila et al. .................. 331/66 |
| 7,171,183 | B2* | 1/2007 | Chien .......................... 455/260 |
| 7,181,180 | B1* | 2/2007 | Teo et al. ..................... 455/260 |
| 7,203,472 | B2* | 4/2007 | Seppinen et al. ............ 455/226.1 |
| 7,289,782 | B2* | 10/2007 | Lin et al. ..................... 455/260 |
| 7,324,789 | B2* | 1/2008 | Jensen .......................... 455/76 |
| 7,365,580 | B2* | 4/2008 | Martin et al. ................. 327/156 |
| 7,405,629 | B2* | 7/2008 | Li ................................ 331/16 |
| 7,424,280 | B2* | 9/2008 | Yu ............................. 455/258 |
| 2002/0094037 | A1 | 7/2002 | Darabi et al. |
| 2003/0067359 | A1 | 4/2003 | Darabi et al. |
| 2003/0092465 | A1 | 5/2003 | Darabi et al. |
| 2003/0181175 | A1 | 9/2003 | Darabi |
| 2003/0181176 | A1 | 9/2003 | Darabi |
| 2003/0181179 | A1 | 9/2003 | Darabi |
| 2003/0181180 | A1 | 9/2003 | Darabi et al. |
| 2003/0181181 | A1 | 9/2003 | Darabi |

(Continued)

OTHER PUBLICATIONS

"Basics of Dual Fractional-N Synthesizers/PLLs", *Skyworks Solutions, Inc.*, (May 17, 2005),13 pages.

(Continued)

*Primary Examiner*—Marceau Milord
(74) *Attorney, Agent, or Firm*—Brake Hughes Bellermann LLP

(57) ABSTRACT

Various embodiments are disclosed relating to techniques to reduce spurs in wireless transceivers. In an example embodiment, a first fractional-N divide ratio for a first frequency synthesizer may be set based on a selected channel. A second fractional-N divide ratio for a second frequency synthesizer may be set to a fixed value independent of the selected channel. The second fractional-N divide ratio may be set to a value that is sufficiently distant from an integer value so as to decrease the likelihood of at least some type(s) of spurs.

18 Claims, 5 Drawing Sheets

U.S. PATENT DOCUMENTS

| | | |
|---|---|---|
| 2003/0181184 A1 | 9/2003 | Darabi et al. |
| 2003/0181188 A1 | 9/2003 | Darabi |
| 2004/0001560 A1 | 1/2004 | Darabi |
| 2004/0102173 A1 | 5/2004 | Darabi |
| 2004/0137870 A1 | 7/2004 | Kivekas et al. |
| 2005/0130615 A1 | 6/2005 | Darabi |
| 2005/0164671 A1 | 7/2005 | Darabi |
| 2005/0197092 A1 | 9/2005 | Darabi |
| 2005/0237100 A1 | 10/2005 | Chiu et al. |
| 2006/0002491 A1 | 1/2006 | Darabi et al. |
| 2006/0003719 A1 | 1/2006 | Darabi |
| 2006/0035609 A1 | 2/2006 | Darabi et al. |
| 2006/0035668 A1 | 2/2006 | Li et al. |
| 2006/0258311 A1* | 11/2006 | Pestryakov et al. ...... 455/165.1 |

OTHER PUBLICATIONS

"Dual Fractional-N Synthesizers/PLLs", *Skyworks Solutions, Inc.*, (Oct. 7, 2005), 5 pages.

* cited by examiner

TECHNIQUES TO DECREASE FRACTIONAL SPURS FOR WIRELESS TRANSCEIVERS

BACKGROUND

Wireless transceivers are used in a wide variety of wireless systems. A wireless transceiver may typically include a wireless receiver for receiving and demodulating signals, and a transmitter for modulating signals for transmission. Wireless transceivers may be capable of transmitting on different frequencies or bands. Transceivers may include a frequency synthesizer to generate one or more frequencies. One problem with frequency synthesizers is that spurs or unwanted tones or signals may be generated, such as fractional spurs, integer-N boundary spurs, and other spurs.

SUMMARY

Various embodiments are disclosed relating to wireless systems, and also relating to techniques to decrease fractional spurs for wireless transceivers.

According to an example embodiment, a wireless transceiver may be provided that includes a first frequency synthesizer that has a first fractional-N divide ratio that is set based on a selected channel for the transceiver. A second frequency transceiver may be provided that has a second fractional-N divide ratio to be set to a fixed value that is sufficiently distant from an integer value so as to decrease spurs or likelihood of spurs for the wireless transceiver. The second fractional-N divide ratio is set to a value independent of the selected channel.

According to another embodiment, a method is provided. A first fractional-N divide ratio may be set based on a selected channel. A second fractional-N divide ratio may be set to a fixed value that is sufficiently distant from an integer value so as to decrease fractional spurs and/or integer-N boundary spurs. The second fractional-N divide ratio set to a fixed value independent of the selected channel.

According to another embodiment, a method is provided. A channel is selected for a wireless transceiver. A first fractional-N divide ratio of a first frequency synthesizer is set based on the selected channel. The wireless transceiver operates in a first mode of operation. A second fractional-N divide ratio of a second frequency synthesizer is set, during the first mode of operation, to a fixed value that is sufficiently distant from an integer value so as to decrease spurs for the wireless transceiver. The wireless transceiver operates in a second mode of operation using the first and second fractional-N divide ratios for the first and second frequency synthesizers, respectively.

DETAILED DESCRIPTION

Figure 1:
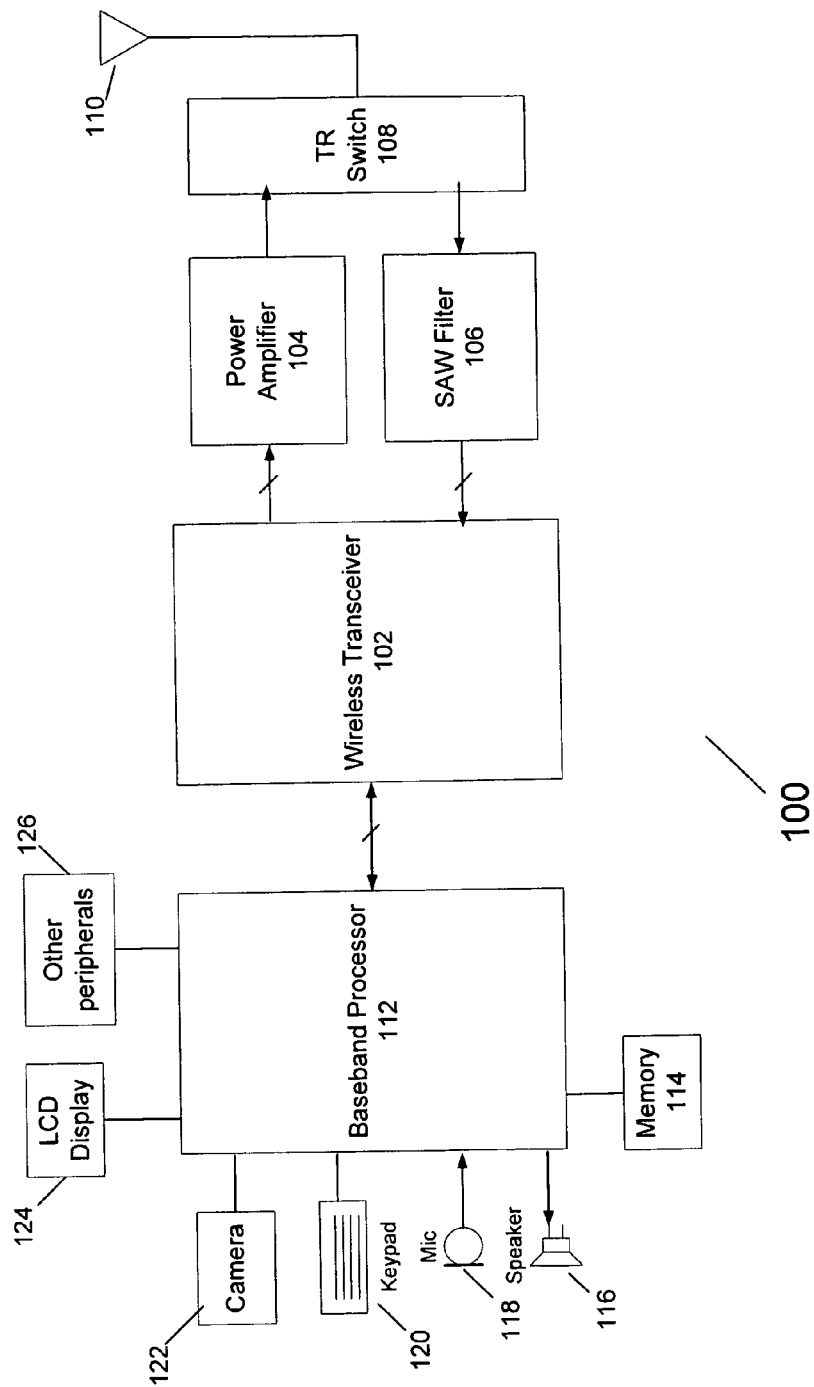
FIG. 1 is a block diagram of a wireless system according to an example embodiment.

FIG. 1 is a block diagram of a wireless system according to an example embodiment. Wireless system 100 may include a wireless transceiver (transmitter/receiver) 102 for transmitting and receiving radio or wireless signals. A baseband processor 112 is coupled to wireless transceiver 110 to perform various types of processing and overall control of system 100, and may perform other tasks. Baseband processor 112 may include a controller, and may include for example, an audio codec to process audio signals, a video or image processing codec (e.g., an MPEG4 compression and/or decompression module), and other components or blocks, not shown.

An antenna 110 may be provided to receive and transmit radio signals or electromagnetic signals. A transmitter/receiver (TR) switch 108 may select either the transmit or receive mode for the antenna 110. Signals output by wireless transceiver 102 to be transmitted may be amplified by amplifier 104 and then transmitted via antenna 110. Signals received via antenna 110 may be filtered by a SAW (surface acoustic wave) filter 106 (or other filter) and then input to transceiver 102. At transceiver 102, the received signals may be processed or demodulated, which may include down-converting the signals to an intermediate frequency (IF) and then down-converting to baseband or other frequency, digital detection of data and other signal processing. Likewise, digital data to be transmitted may be received by transceiver 102 from baseband processor 112. Wireless transceiver 110 may modulate the digital data from baseband processor 112 onto a selected channel or frequency (or range or spectrum of frequencies) for transmission over antenna 110.

A variety of blocks or peripherals may be coupled to baseband processor 112. For example, a memory 114, such as a Flash memory or Random Access Memory (RAM), may store information. A microphone 118 and speaker 116 may allow audio signals to be input to and output by wireless system 100, such as for a cell phone or other communications device. A keypad 120 may allow a user to input characters or other information to be processed by wireless system 100. A camera 122 or other optical device may be provided to allow users to capture photos or images that may be processed and/or stored by system 100 in memory or other storage location. Wireless system 100 may also include a display 124, such as a liquid crystal display for example, to display information (text, images, etc.). A variety of other peripherals 126 may be coupled to baseband processor 112, such as a memory stick, an audio player, a Bluetooth wireless transceiver, a USB (Universal Serial Bus) port, or other peripheral. These are merely a few examples of the types of devices or peripherals that may be provided as part of wireless system 100 or coupled to baseband processor 112, and the disclosure is not limited thereto.

Wireless system 100 may be used in a variety of systems or applications, such as a mobile or cellular phone, a wireless local area network (WLAN) phone, a wireless personal digital assistant (PDA), a mobile communications device, or other wireless device. In an example embodiment, wireless system 100 may be capable of operating in a variety of transmit/receive frequencies or frequency bands and for a variety of different standards or communications protocols. Although not required, wireless system 100 may be a multi-band wireless system capable of transmitting or receiving signals on one of a plurality of frequencies or bands. For example, wireless system 100 may operate at or around 1900

MHz for WCDMA (Wide-Band Code Division Multiple Access) or PCS (Personal Communications Services), at or around 1800 MHz for DCS (Distributed Communication Services) (these frequencies may be considered an upper band of frequencies), at 850 MHz for GSM (Global System for Mobile communication), at or around 900 MHz for EGSM (Extended GSM) (these frequencies may be considered a lower band of frequencies). These are merely some example frequencies, and the system 100 may operate at many other frequencies and standards.

Figure 2:
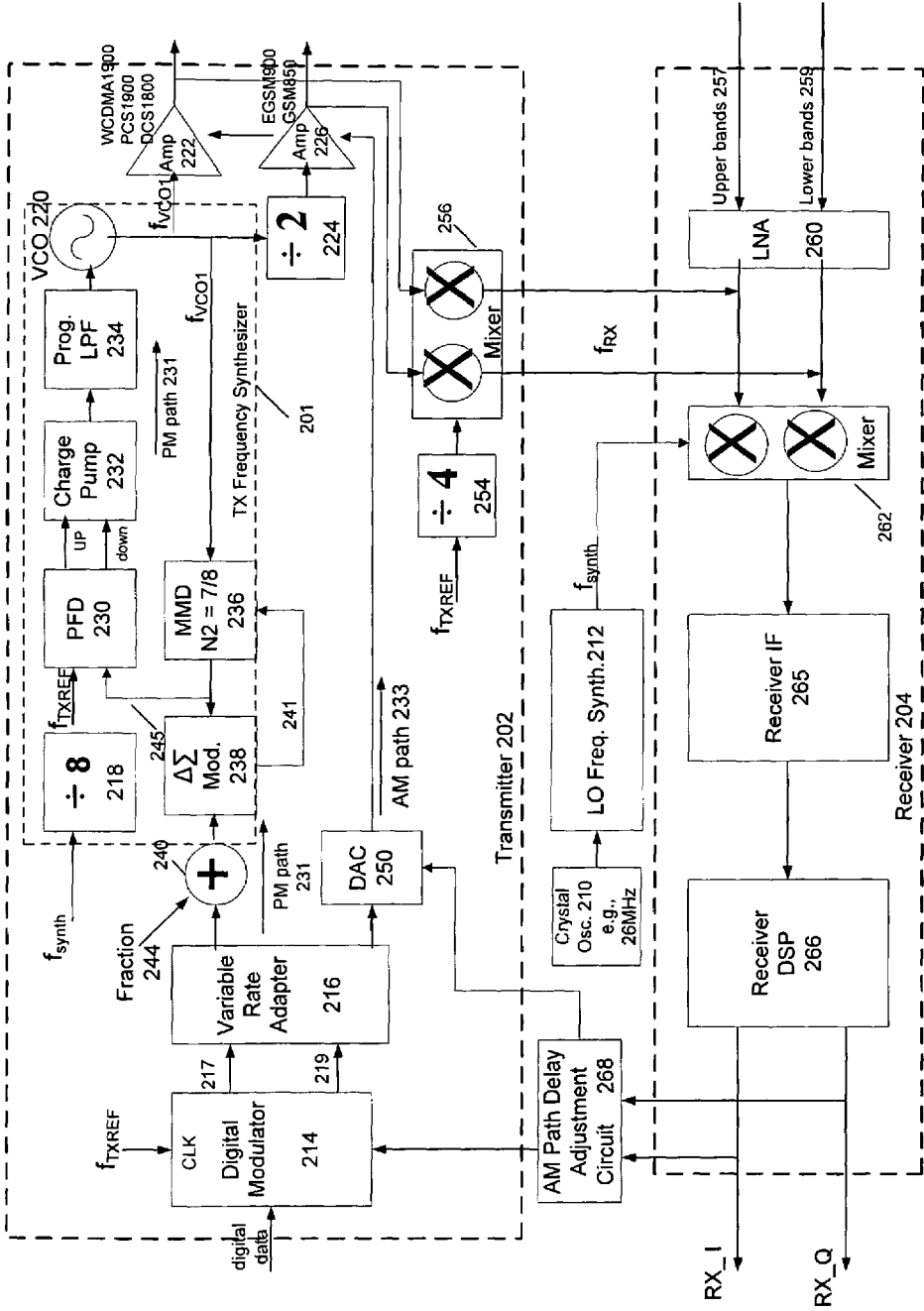
FIG. 2 is a block diagram of a wireless transceiver according to an example embodiment.

FIG. 2 is a block diagram of a wireless transceiver according to an example embodiment. Wireless transceiver 102 may include a transmitter 202 to modulate and transmit data, and a receiver 204 to receive and demodulate data. A crystal oscillator 210 may generate a signal at a constant frequency, such as 26 MHz or other frequency (26 MHz is merely an example and other frequencies may be used). A local oscillator (LO) frequency synthesizer 212 may generate a synthesized frequency signal ($f_{synth}$) at a selected one of a plurality of frequencies, e.g., based on a selected channel. The synthesized frequency signal ($f_{synth}$) may be used by both the transmitter 202 and receiver 204 as a reference signal.

A digital modulator 214 may receive digital data and output data onto one or more paths. According to an example embodiment, transmitter 102 may modulate received data using a variety of Phase Shift Keying (PSK), such as 8PSK, Quadrature Amplitude Modulation (QAM), etc., in which data may be modulated using both phase modulation and amplitude modulation. Digital modulator 214 may alternatively modulate received data using phase modulation or frequency modulation, or variations thereof, such as Gaussian-Filtered Minimum Shift Keying (GMSK), and the like. According to an example embodiment, for such a phase modulation or frequency modulation or GMSK modulation, or the like, the amplitude of the signal output by transmitter 202 may be, for example, set to a constant amplitude or level.

To be able to accommodate different frequencies and different channels, $f_{synth}$ may be a variable frequency between, for example, 1.752 GHz and 2.0 GHz. This is merely an example frequency range, and other frequencies or frequency ranges may be used. $f_{synth}$ may be frequency divided by frequency divider 218 to generate a transmit reference frequency ($f_{TXREF}$). In an example embodiment, frequency divider 218 may be a divide by 8. Therefore, $f_{TXREF}$ may be generated as $f_{synth}/8$, and in such case, $f_{TXREF}$ may vary between 219 MHz and 250 MHz, for example.

Digital modulator 214 may receive digital data and output signals on both lines 217 and 219 to a variable rate adapter 216. In an example embodiment, digital modulator 214 may use $f_{TXREF}$ as a clock. As noted, $f_{TXREF}$ may be a variable frequency. Variable rate adapter 216 may compensate for the variable rate clock ($f_{TXREF}$) that may be used by digital modulator 214, e.g., such that signals output by variable rate adapter 216 may be output at a constant frequency even though clock for digital modulator 214 may vary.

In order to perform both phase modulation (PM) (or a variation thereof) and amplitude modulation (AM) on the received digital data, such as for 8PSK or QAM or the like, variable rate adapter 216 may output signals onto two paths including: 1) a PM path 231 to perform phase modulation based on received data; and 2) an AM path 233 to perform amplitude modulation based on the received data.

The PM path will now be discussed. In the PM path 231, a transmit frequency synthesizer 201 may include a phase-locked loop (PLL) and a delta-sigma modulator 238. Within the transmit frequency synthesizer 201, a voltage controlled oscillator (VCO) 220 may output a signal at an operating frequency for a selected channel for a selected band of a service (e.g., channel number 2 at a center frequency of 1710.2 MHz for DCS). For example, a base station or Access Point (AP) may assign the wireless system 100 a channel to use for data transmission. As described in more detail below, VCO 220 may output a range of frequencies or a modulated frequency spectrum for the selected channel, with the data being modulated onto the frequency spectrum. VCO 220 may also include a gain, or an amount which the output spectrum from VCO 220 is amplified. This gain (K) of VCO 220 may be referred to as $K_{VCO}$. In an example embodiment, the gain of VCO 220 ($K_{VCO}$) may be calibrated.

The frequency spectrum output by VCO 220 may then be amplified by upper band amplifier 222 for transmission via antenna 110. The frequency spectrum output by VCO 220 may also be divided by two by frequency divider 224 and then amplified by lower band amplifier 226 for data transmission over antenna 110. Thus, according to an example embodiment, a frequency spectrum for a selected channel in the upper band of frequencies may be amplified and output by amplifier 222, while a frequency spectrum for a selected channel in the lower band of frequencies may be amplified and output by amplifier 226.

As noted above, transmit frequency synthesizer 201 may include a PLL. According to an example embodiment, the phase-locked loop (PLL) within transmit frequency synthesizer 201 may control or lock the VCO 220 to a desired or selected operating frequency (channel). The PLL within transmit frequency synthesizer 201 may include, for example, a phase-frequency detector (PFD) 230, a charge pump 232 and a programmable low pass filter (LPF) 234 (also referred to as a loop filter), and may include other or different components, since this is merely an example PLL. The output ($f_{VCO1}$) of VCO 220 may include an operating frequency of a selected channel (e.g., center frequency). An integer-N (frequency) divider 236 is coupled to the feedback loop of the PLL, and may divide a received frequency by a selected divider number (e.g., an integer, either 7 or 8). The output frequency of VCO 220 ($f_{VCO1}$) is divided by a divider number (N2) of integer-N divider 236 that is selected by a 1-bit delta-sigma ($\Delta\Sigma$) modulator 238 via line 241. Integer-N divider 236 may be considered to be a multi-modulus divider (MMD) since the divider number (N2) used by integer-N divider 236 may be one of multiple different numbers (integers). The transmit frequency synthesizer 201 may provide a selected fractional-N divide ratio (average N2) by dynamically switching the divider number (N2) of integer-N divider 236 between two or more integer numbers. Thus, transmit frequency synthesizer 201 may be considered to be a fractional-N frequency synthesizer.

In an example embodiment, the divider number used by integer-N divider 236 may be either 7 or 8, based on the signal (bit) received from delta-sigma modulator 238 via line 241 (e.g., a 0 output on line 241 by modulator 238 to indicate a 7 for the divider number N2, while a 1 indicating an 8 for divider number N2). Therefore, according to an example embodiment, the operating frequency output by VCO 220 may be $f_{VCO1}=N2*f_{TXREF}$. The integer divider numbers of 7 or 8 may allow only two operating frequencies to be output by VCO 220 for a particular $f_{TXREF}$ (transmitter reference frequency). However, by varying the selected integer divider number used by integer-N divider 236, almost any (average) fractional-N divide ratio (average N2) between 7 and 8 may be obtained, which may allow VCO 220 to output a range of frequencies.

In order to lock or control the VCO 220 to a desired to selected output frequency (for the selected channel), a $f_{synth}$ (and thus $f_{TXREF}$) is selected, and an average fractional-N divide ratio (average N2) is selected between 7 and 8 (in this example embodiment, although any numbers may be used) that will provide the selected operating frequency output by VCO 220. For example, if a transmit operating frequency is assigned or selected of 1.661 GHz, then a transmit reference frequency ($f_{TXREF}$) may be selected of 220 MHz, and a (average) fractional-N divide ratio of 7.55 may be used. Thus, in this example, a VCO output (operating frequency for the channel) is thus obtained as: $f_{VCO1}$=N2 (average)*$f_{TXREF}$, which in this case may be calculated as: $f_{VCO1}$=7.55*220 MHz=1.661 GHz, which is the desired operating frequency (e.g., center frequency for the assigned transmission channel).

The fractional-N divide ratio (7.55 in this example) between 7 and 8 may be obtained by using delta sigma modulator 238 to vary the divider number (N2) of integer-N divider 236 to divide by 7 and divide by 8 an appropriate amount or percentage to obtain the selected (average) fractional-N divide ratio (average N2). For example, to obtain a fractional-N divide ratio of 7.5, then the integer-N divider 236 would divide by 7 half of the time, and divide by 8 the other half of the time (50% duty cycle, half zeroes, half ones). By changing the duty cycle or percentage of zeros and ones output by delta sigma modulator 238 via line 241, the frequency ($f_{VCO1}$) received via line 243 may be divided by a selected fractional-N divide ratio (e.g., 7.55).

The fractional portion (0.55 in this example) of the selected fractional divider number (7.55 in this example) may be input to combiner 240. Combiner 240 may add or combine the fraction 244 (0.55 in this example) with a data signal (to provide phase modulation) output by variable rate adapter 216. The output of combiner 240 may control delta-sigma modulator 238 to obtain the (average) selected fractional-N divide ratio for transmit frequency synthesizer 201.

In an example embodiment, VCO 220 may not necessarily output a single tone or frequency, but rather, may output a modulated frequency spectrum, such as a phase modulated spectrum. In an example embodiment, the delta sigma modulator 238 may control the integer-N divider 236 to vary the divider number (N2) around the selected fractional divide ratio so as to cause VCO 220 to generate a phase modulated frequency spectrum. In part, the delta sigma modulator 238 may be controlled based on signals output via line 217 from digital modulator 214 (e.g., to allow phase modulation of the output signal output from VCO 220), and passed through (e.g., after compensation) by variable rate adapter 216. This may allow the output from VCO 220 ($f_{VCO1}$) to be a phase modulated frequency spectrum around a center frequency for the selected channel (the operating frequency selected by the fractional-N divide ratio, such as 7.55, for example).

An operation of the example PLL of transmit frequency synthesizer 201 of transmitter 202 will be briefly described. The transmitter reference frequency ($f_{TXREF}$) is input as a reference signal to PFD 230. The divided frequency signal output on line 245 from divider 236 is a second input to PFD 230. PFD 230 may generate an output signal(s) based on the phase difference between its two input signals. For example, an up signal or a down signal may be output by PFD 230 based on whether the divided frequency signal on line 245 leads or lags the reference frequency signal ($f_{TXREF}$), respectively. Charge pump 232 may generate positive or negative charge pulses based on whether the divided frequency signal on line 245 leads or lags the reference signal ($f_{TXREF}$), respectively. Programmable low pass filter (LPF) 234 may integrate or accumulate the charge pulses to generate a voltage, which, for example, may indicate the amount that the divided frequency signal on line 245 leads or lags the reference signal ($f_{TXREF}$). The voltage output by LPF 234 may control or adjust the frequency ($f_{VCO1}$) output by VCO 220.

Thus, via the PM path 231, VCO 220 may output a phase modulated frequency spectrum, which is then amplified and output by upper band amplifier 222. Similarly, the output from VCO 220 is divided by two by divider 224, and is then amplified and output by lower band amplifier 226.

In an example embodiment, LPF 234 (of the PLL) may set the loop bandwidth of the PLL. If the bandwidth of the LPF is too narrow, part of the output spectrum from VCO 220 may be clipped or distorted. Likewise, if the bandwidth of LPF 234 is too wide, this may introduce an unacceptable amount of noise into the system. Therefore, according to an example embodiment, a relatively narrow bandwidth may be used for LPF 234, such as 200 KHz (this is merely an example, and other bandwidths may be used). Also, in an example embodiment, digital modulator 214 may include an equalizer to account for some clipping or signal distortion that may occur due to the 200 KHz bandwidth of low pass filter (LPF) 234. In an example embodiment, LPF 234 may be an R-C (resistor-capacitor) filter, which may be calibrated.

In cases in which the transmitted signal may be both phase modulated and amplitude modulated, such as for 8PSK, QAM or the like, the AM path 231 may perform amplitude modulation on the phase modulated spectrum based on the received digital signals. As noted, the digital data is received by digital modulator 214. The digital modulator 214 may output data via two paths, to provide both phase modulation (via PM path 231) and amplitude modulation (via AM path 233).

The AM path 233 will now be briefly described. Digital modulator 214 outputs signals (e.g., via variable rate adapter 216) to digital-to-analog converter (DAC) 250. DAC 250 converts received digital signals to analog signals. The analog signals, which may represent or indicate an amplitude, are input to amplifiers 226 and 222. Amplifiers 226 and 222 may amplitude modulate (or vary the amplitude) of the phase modulated spectrum provided from the VCO 220 based upon the signals received from DAC 250 via AM path 233. Thus, signals received via the AM path 233 may control the amplitude or gain of the phase modulated signals (spectrum) output by transmitter 202. Therefore, amplifiers 222 and 226 may output an amplitude and phase modulated signal (e.g., frequency spectrum), according to an example embodiment.

In cases where only phase or frequency modulation is performed (such as, for example, GMSK for GSM and EGSM), then the amplitude value output by digital modulator 214 to DAC 250 may be set to a constant level, to provide a constant amplitude for the phase modulated spectrum output by amplifiers 222 and 226. In an embodiment, the constant amplitude used by DAC 250 for such modulations may be typically set to a maximum to provide a high saturated output power.

Receiver 204 of wireless transceiver 102 (FIG. 2) will now be briefly described. Wireless signals may be input to receiver 204, including upper (or high) band signals received via line 257, and lower band signals received via line 259. These received signals may be amplified by low noise amplifier (LNA) 260. During normal operation, the received wireless signal may be down converted by mixer 262, based on the synthesizer frequency ($f_{synth}$) output by LO frequency synthesizer 212 (e.g., the received signal may be mixed with $f_{synth}$ by mixer 262 to generate an IF signal.). In an embodiment, the received signal may then be down converted to an intermediate frequency (IF) of 200 KHz, for example (although any frequency may be used for IF). The IF signal may be input to receiver IF block 265 (which may include, for example, filters, gain control and other circuits) where IF processing is performed. The signals output by receiver IF block 265 are input to a receiver DSP 266, which may include, for example, gain control and digital signal processor to down convert the IF signal to baseband. Receiver DSP 266 may output in-phase and quadrature-phase receive signals (RX_I, Rx_Q, respectively). The receive signals (RX_I and RX_Q) may also be output to digital modulator 214 (connection not shown), and also to an AM path delay adjustment circuit 268.

Wireless systems, at least in some cases, may be required to meet one or more signal requirements. For example, some wireless technologies may require wireless transmissions meet (or fall within) a spectral mask.

One issue that may arise for wireless systems that employ two types of modulation, such as both amplitude and phase or frequency modulation (e.g., such as 8PSK, QAM, etc.) is that there may be a mismatch in the timing or delay for the phase modulation and amplitude modulation (or more generally, a mismatch in the delay of a first modulation path and a second modulation path). In some cases, if the mismatch in delay or timing through the AM path and PM path of the transceiver is significant, it may distort the output or transmitted signal such that the output signal does not meet one or more signal requirements (such as a spectral mask). Therefore, for example, to avoid violating a spectral mask or other signal requirements, it may be desirable for the delay (or timing) through the AM path 231 and PM path 233 to be well matched.

According to an example embodiment, the receiver 204 of transceiver 102 may be used to calibrate the delay or timing for the AM path 231 and PM path 233 of transmitter 202. The transmitter reference frequency $f_{TXREF}$ may be divided by four by frequency divider 254. This divided signal ($f_{TXREF}/4$) may be input to mixer 256. Mixer 256 may up-convert the frequency of the modulated transmit frequency spectrum (amplitude and phase modulated output spectrum from amplifiers 222 and 226) to receive frequencies (e.g., upper and/or lower band receive frequencies that can be processed by receiver 204). During delay path calibration mode, the up-converted modulated transmit frequency spectrum is then fed or input to receiver 204 for processing. The transmit frequency spectrum may be down converted by mixer 262 to IF (e.g., 200 KHz), and processed by receiver IF block 265 and receiver DSP 266. The processed (or demodulated) transmit spectrum may then be output via receive signals (RX_I and RX_Q). This processing of the signals at receiver 204 may be considered to be a form of demodulation, in an example embodiment.

The processed or demodulated transmit spectrum may then be analyzed by AM path delay adjustment circuit 268, e.g., to determine if the demodulated transmit spectrum meets one or more signal requirements, such as determining if the demodulated transmit spectrum meets or falls within a required spectral mask. Alternatively, path delay adjustment circuit 268 may determine if there is a significant mismatch between the timing or delay of the AM path 233 and PM path 231, for example. Path delay adjustment circuit 268 may then adjust the delay or timing of one or both of the AM path 233 and PM path 231, e.g., if the demodulated (or processed) transmit spectrum does not meet the one or more signal requirements or mask, or if there is a significant mismatch in the timing or delay between the AM path 233 and PM path 231, for example. Path delay adjustment circuit 268 may adjust the delay or timing of the AM path 233 or the PM path 231, or both.

In another example embodiment, the gain of VCO 220 may be calibrated. In such case, in an example embodiment, the loop bandwidth of the PLL and LPF 234 may be well defined, and the delay through the PLL (PM path) and the AM path may also be stable and well defined. As a result, this is one example where it may not be necessary to calibrate the modulation delay paths (AM and PM paths). Thus, in an example embodiment, the modulation path delay calibration may be optional, and may be disabled or turned of in some cases.

In an example embodiment, path delay adjustment circuit 268 may be an AM path delay adjustment circuit that may adjust the delay of the AM path 233, based on the analysis or evaluation of the demodulated transmit spectrum (e.g., if the demodulated spectrum does not meet the signal requirement or mask). For example, path delay adjustment circuit 268 may adjust the delay provided by DAC 250 in AM path 233. This process may be repeated and re-calibrated, e.g., another modulated transmit frequency spectrum signal may be up-converted by mixer 256 to the receive frequency, and input to the receiver 204, where the spectrum may be down converted to IF, down converted to baseband and processed (e.g., demodulated). The demodulated or receive-processed transmit spectrum may again be evaluated or analyzed, and then a delay or timing may be adjusted in one or both AM path 233 and PM path 231, if necessary, to improve the match in path delay or improve the quality of the output signal. In this manner, the AM path delay and PM path delay of transmitter 202 may be calibrated (e.g., measured and adjusted) by feeding the modulated transmit spectrum into the receiver 204 for processing.

Figure 3:
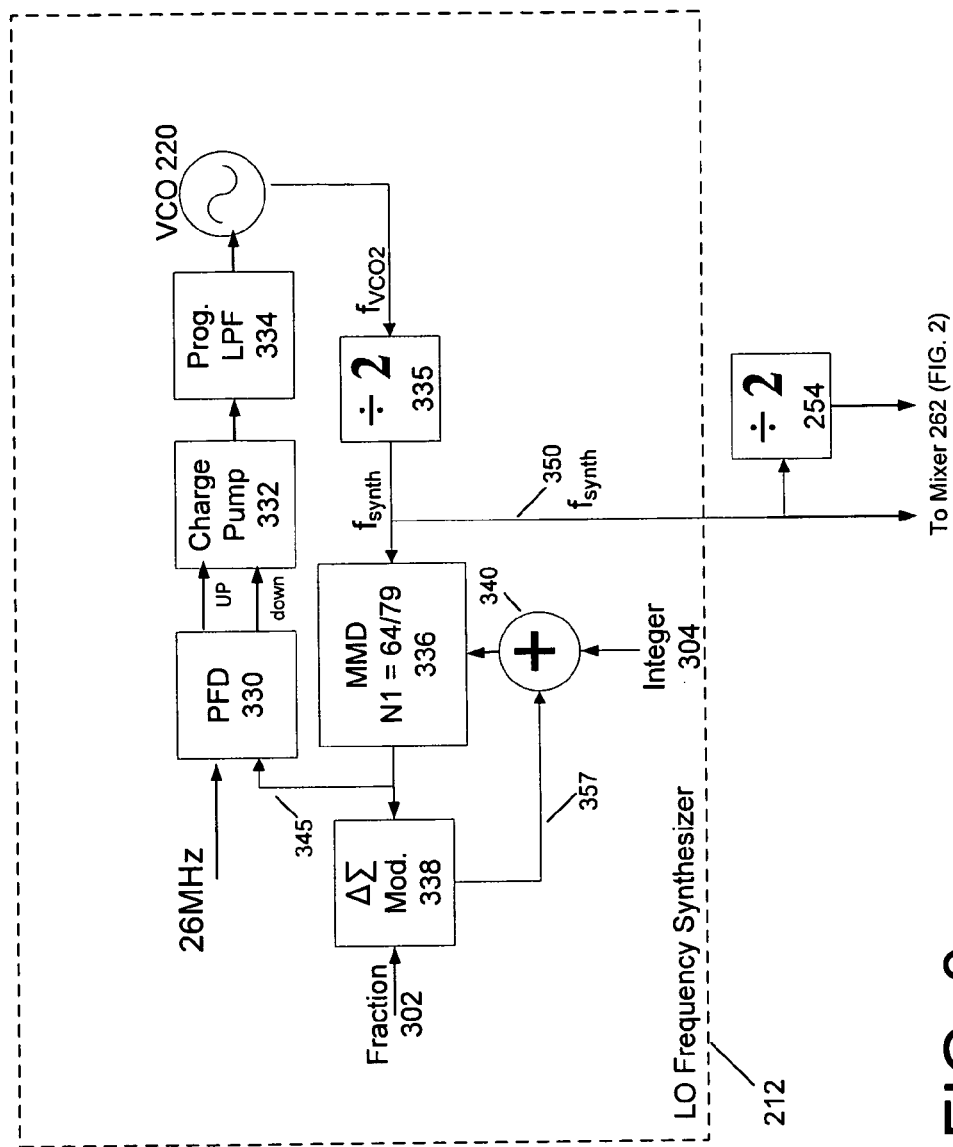
FIG. 3 is a block diagram illustrating a local oscillator (LO) frequency synthesizer of FIG. 2 according to an example embodiment.

FIG. 3 is a block diagram illustrating a local oscillator (LO) frequency synthesizer of FIG. 2 according to an example embodiment. LO frequency synthesizer 212 may be very similar to the transmit frequency synthesizer 201 in FIG. 2. LO frequency synthesizer 212 may include a phase-locked loop (PLL) and a delta-sigma modulator 338. According to an example embodiment, the phase-locked loop (PLL) within transmit frequency synthesizer 201 may control or lock the VCO 320 to output a desired or selected synthesized frequency ($f_{synth}$), e.g., based on a selected channel. The synthesized frequency ($f_{synth}$) output by LO frequency synthesizer 212 may be used as a reference frequency by the transmitter 202 and receiver 204.

The PLL within LO frequency synthesizer 212 may include, for example, a phase-frequency detector (PFD) 330, a charge pump 332 and a programmable low pass filter (LPF) 334 (also referred to as a loop filter), and may include other or different components, since this is merely an example PLL. The output ($f_{VCO2}$) of VCO 320 may include a tone or frequency that is divided by 2 by frequency divider 335, to generate the synthesized frequency ($f_{synth}$). An integer-N (frequency) divider 336 is coupled to the feedback loop of the PLL, and may divide a received frequency by a selected divider number (e.g., an integer, between 64 and 79). The synthesized frequency ($f_{synth}$) on line 350 is then divided by a divider number (N1) of integer-N divider 236 that is selected by a delta-sigma ($\Delta\Sigma$) modulator 338 via line 357. Integer-N divider 336 may be considered to be a multi-modulus divider (MMD) since the divider number (N1) used by integer-N divider 336 may be one of multiple different numbers (integers), e.g., between 64 and 79. The LO frequency synthesizer 212 may provide a selected fractional-N divide ratio (average N1) by dynamically switching the divider number (N1) of integer-N divider 336 between two or more integer numbers. Thus, LO frequency synthesizer 212 may be considered to be a fractional-N frequency synthesizer.

In an example embodiment, the divider number used by integer-N divider 236 may be any number between 64 and 79, based on the signal received from delta-sigma modulator 338 via combiner 340. Combiner 340 may combine the output from modulator 338 with an integer 304. A fraction 302 may also be input to modulator 302. A 26 MHz reference input is used as one input to PFD 330. The other input to PFD 330 is the output from integer-N divider 336, via line 345. The PLL of LO frequency synthesizer 212 operates similarly to the PLL of transmit frequency synthesizer 201, described above. In general, by varying the selected integer divider number used by integer-N divider 336, almost any (average) fractional-N divide ratio (average N1) between 64 and 79 may be obtained, which may allow VCO 320 to output a range of frequencies. The PLL of LO frequency synthesizer 212 may operates to control or lock the output frequency ($f_{VCO2}$)=26 MHz*2*N1. Thus, the frequency output from VCO 320 (and thus the frequency of $f_{synth}$) may be generated based on a selected average fractional-N divide ratio (average N1) for divider 336.

The frequency synthesizer signal ($f_{synth}$) may be input to mixer 262. In addition, the frequency synthesizer signal ($f_{synth}$) may be divided by 2 by frequency divider 360, and then divided by two again by frequency divider 362, with these two divided signals output to mixer 262.

The output ($f_{synth}$) from LO frequency synthesizer 212 may be a tone or a single frequency, for example. Therefore, the bandwidth of LPF 334 may be relatively narrow, for example 40 KHz. This bandwidth is wide enough to allow the tone or frequency to be transmitted, and is narrow enough to filter out or remove unwanted spurs or tones.

On the other hand, the output from transmitter frequency synthesizer 201 may typically be a modulated spectrum, which is a spectrum or range of frequencies. Thus, due to the modulated spectrum being broader than a tone, the bandwidth of the LPF 234 may need to be significantly wider than the bandwidth of LPF 334 of transmit frequency synthesizer 212. For example, while the bandwidth of LPF 334 (for LO frequency synthesizer) may be 40 KHz (narrower loop bandwidth to accommodate a tone or single frequency), the bandwidth of LPF 234 (for transmit frequency synthesizer) may be 200 KHz (a wider loop bandwidth to accommodate a modulated spectrum). While a 200 KHz loop bandwidth for the transmit frequency synthesizer is wide enough to allow the modulated spectrum to pass, it may also allow unwanted spurs (e.g., fractional spurs, integer-N boundary spurs, and the like) which may be generated, to pass as well. One type of common spur may occur when the fractional-N divide ratio is near an integer, such as near 7.0 or near 8.0, for example. For example, these type of spurs may be generated for an average fractional-N divide ratio of 6.98, or 7.01, etc. (e.g., divide ratios near the integer of 7), for example.

Therefore, according to an example embodiment, through a selected structure and/or choice of components or blocks for transceiver 102, a fractional-N divide ratio (N2) may be obtained (for the transmit frequency synthesizer 201) that is not substantially near an integer value, thereby decreasing likely spurs. Several equations are provided below, based on the example structure and selection of blocks for the transceiver 102. These equations demonstrate can how design or planning or selection for a transceiver can allow a value for a fractional-N divide ratio (N2) to be selected so as to be sufficiently distant or remote from an integer so as to decrease the likelihood of some types of spurs, e.g., fractional spurs or integer-N boundary spurs.

With respect to the transmitter 202: $f_{synth}=8*f_{VCO1}/N2$ (Eqn. 1). Note, that the 8 in Eqn. 1 comes from the value of frequency divider 218.

With respect to receiver 204, during calibration mode, the intermediate frequency ($f_{IF}$) is generated by mixer 262 based on $f_{synth}$ and $f_{RX}$ (output from mixer 256):
$f_{IF}=f_{RX}-f_{synth}$. Thus, $f_{RX}=f_{synth}+f_{IF}$. But with $f_{IF}$ being small (200 KHZ) compared to $f_{synth}$, this can be simplified as: $f_{RX}=f_{synth}$ (Eqn. 2).

With respect to the calibration loop: $f_{synth}/32+f_{VCO1}=f_{RX}$. (Eqn. 3). Note that the 32 in Eqn. 3 comes from the value of 8 for frequency divider 218 and value of 4 for frequency divider 254 (where 8*4=32). Plugging in Eqn. 1 for $f_{synth}$ and Eqn. 2 for $f_{RX}$ in Eqn. 3, and solving for N2 provides N2=7.75 for upper band. Solving a similar set of equations for the lower band provides N2=7.5 for lower band. These values for N2 are far away from an integer (7 or 8) so as not to create these type of spurs, or decrease the risk or likelihood of these type of spurs. Thus, by some planning or selection and design (e.g., including selection of divide values for frequency dividers 218 and/or 254), the values of fractional-N divide ratio (N2) can be set to a fixed value that may be sufficiently distant from (or not substantially close to) an integer value so as to decrease spurs (e.g., fractional spurs and/or integer-N boundary spurs) for wireless transceiver 102. According to an example embodiment, the selection of N2 is independent of N1 and is independent of a selected channel for transceiver 102.

Note, that while these type of spurs may be a concern for the transmit frequency synthesizer 201 due to its relatively wide bandwidth (e.g., 200 KHz), the same concerns may not necessarily apply for the LO frequency synthesizer 212 since it has a narrower loop bandwidth (e.g., only 40 KHz). Thus, the potential unwanted spurs which may be generated by the LO frequency synthesizer 212 may typically be filtered or removed by LPF 334. Thus, the fractional-N divide ratio (N1) for the LO frequency synthesizer 212 may be permitted to be an integer or near an integer without concern for these type of integer-N boundary spurs or fractional spurs since these spurs may typically be filtered or removed by the narrower loop filter 334, according to an example embodiment.

The fractional-N divide ratio N1 for LO frequency synthesizer 212 may be determined based on the selected channel. $N1=f_{synth}/26$ MHz. $f_{synth}$ is determined based on the selected channel. Thus, N1 will typically be determined based on the selected channel.

Thus, there are two fractional-N synthesizers in transceiver 102. LO frequency synthesizer 212 may transmit a tone or single frequency, and therefore, may use a relatively narrow (e.g., 40 KHz) loop filter (LPF 334). Therefore, these type of spurs may not be a significant concern for LO frequency synthesizer 212, since these spurs may be filtered by LPF 334. On the other hand, transmit frequency synthesizer 201 may transmit a modulated spectrum, and thus may use a wider loop filter (LPF 234, e.g., 200 KHz). As a result, it may be desirable to set a fractional-N divide ratio (N2) for transmit frequency synthesizer 201 that is not close to an integer or is sufficiently distant from an integer to decrease the likelihood of spurs.

Figure 4:
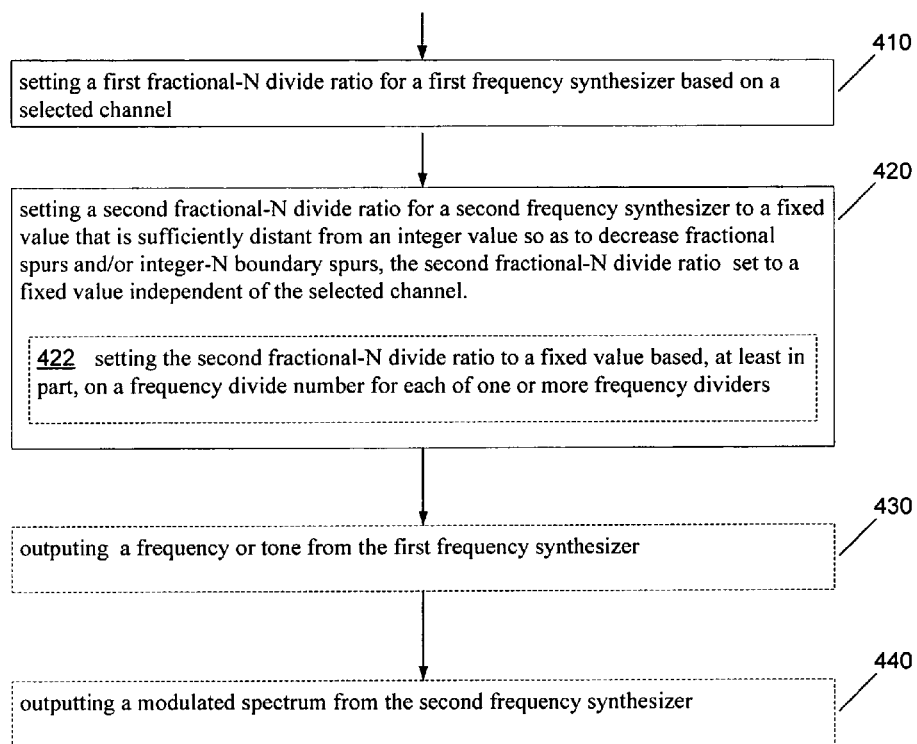
FIG. 4 is a flow chart illustrating a method according to an example embodiment.

FIG. 4 is a flow chart illustrating a method according to an example embodiment. At 410, a first fractional-N divide ratio for a first frequency synthesizer may be set based on a selected channel.

At 420, a second fractional-N divide ratio may be set for a second frequency synthesizer. The second fractional-N divide ratio may be set to be sufficiently distant from an integer value so as to decrease fractional spurs or the likelihood of fractional spurs and/or integer-N boundary spurs. The second fractional-N divide ratio may be set to a fixed value independent of the selected channel. In an example embodiment, the second fractional-N divide ratio may be set based, at least in part, on a frequency divide number for each of one or more frequency dividers, 422.

In addition, the method of FIG. 4 may include a number of additional or optional blocks. At 430, a tone or frequency may be output from the first frequency synthesizer. At 440, a modulated spectrum may be output from the second frequency synthesizer.

Figure 5:
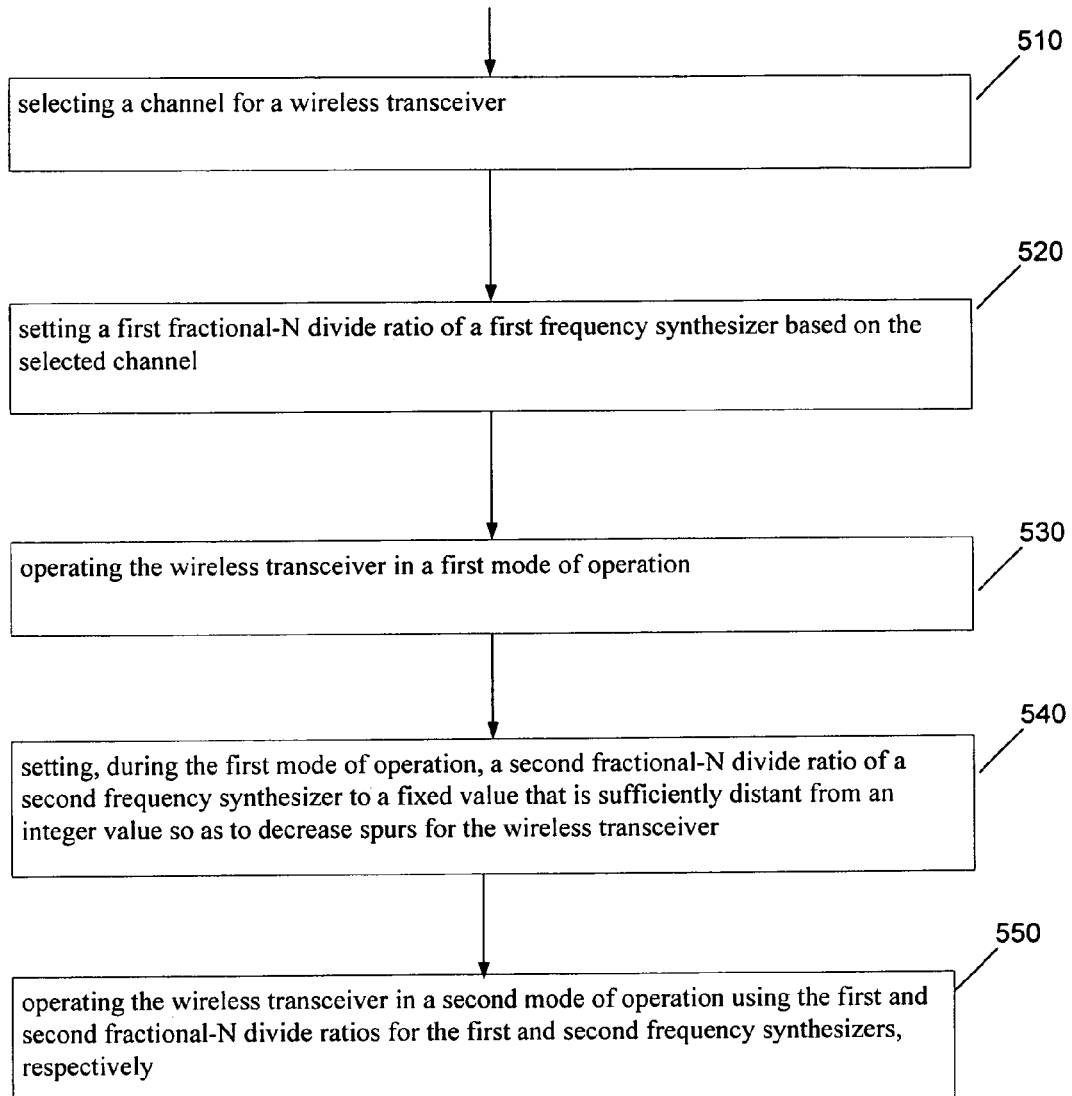
FIG. 5 is a flow chart illustrating a method according to another example embodiment.

FIG. 5 is a flow chart illustrating a method according to another example embodiment. The wireless transceiver 102 may operate in multiple modes of operation, such as a calibration mode in which one or more parameters may be measured and/or calibrated, and a normal operating mode or transmit/receive mode in which the transceiver may transmit and receive data.

At 510, a channel may be selected for a wireless transceiver. This selected channel may be assigned by a base station, access point or other station, for example. At 520, a first fractional-N divide ratio (e.g., N1) may be set for a first frequency synthesizer based on the selected channel. At 530, the wireless transceiver may be operated in a first mode of operation (such as a calibration mode of operation).

At 540, a second fractional-N divide ratio (e.g., N2) may be set for a second frequency synthesizer during the first mode of operation (e.g., during calibration). The second fractional-N divide ratio may be set to a fixed value that is sufficiently distant from an integer value so as to decrease spurs for the wireless transceiver.

At 550, the wireless transceiver is operated in a second mode of operation using the first and second fractional-N divide ratios for the first and second frequency synthesizers, respectively.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A wireless transceiver comprising:
   a first frequency synthesizer having a first fractional-N divide ratio to be set based on a selected channel for the transceiver; and
   a second frequency synthesizer having a second fractional-N divide ratio to be set to a fixed value that is sufficiently distant from an integer value so as to decrease spurs for the wireless transceiver,
      the fractional-N divide ratio for the second frequency synthesizer set to a fixed value independent of the selected channel for the transceiver.

2. The wireless transceiver of claim 1 and further comprising at least one frequency divider, the second fractional-N divide ratio of the second frequency synthesizer set to a fixed value based, at least in part, on a frequency divide number for each of the at least one frequency dividers.

3. The wireless transceiver of claim 1 wherein the first frequency synthesizer comprises a local oscillator/generator frequency synthesizer to generate a frequency or tone, and wherein the second frequency synthesizer comprises a transmitter frequency synthesizer to generate a modulated spectrum.

4. The wireless transceiver of claim 1 wherein the second frequency synthesizer having a second fractional-N divide ratio to be set to a fixed value that is sufficiently distant from an integer value so as to decrease one or more of fractional spurs and integer-N boundary spurs for the wireless transceiver.

5. The wireless transceiver of claim 1 wherein the first frequency synthesizer is adapted to output a tone or frequency, and wherein the second frequency synthesizer is adapted to output a modulated spectrum.

6. The wireless transceiver of claim 1 wherein one or more of the first and second frequency synthesizers each includes a phase-locked loop coupled to a delta-sigma modulator.

7. The wireless transceiver of claim 1 wherein each of the first frequency synthesizer and the second frequency synthesizer includes a phase-locked loop (PLL) coupled to a delta-sigma modulator, the PLL for each of said frequency synthesizers including an integer-N divider to be switched between integer values, the first and second frequency synthesizers obtaining the first and second fractional-N divide ratios, respectively, based on an average divide ratio provided by the respective integer-N divider.

8. The wireless transceiver of claim 1 wherein a loop bandwidth of the first frequency synthesizer is less than the loop bandwidth of the second frequency synthesizer.

9. The wireless transceiver of claim 1, the wireless transceiver being operable in a first mode of operation and in a second mode of operation, wherein the first and second fractional-N divide ratios are adapted to be set during the first mode of operation of the wireless transceiver, and the transceiver is adapted to use the fractional-N divide ratios, set during the first mode of operation, during the second mode of operation for the wireless transceiver.

10. The wireless transceiver of claim 9, wherein the first mode of operation includes a calibration mode, and the second mode of operation for the transceiver includes a wireless transmit/receive operating mode.

11. The wireless transceiver of claim 1 wherein the wireless transceiver includes a transmitter, a receiver, and a feedback path coupled between the transmitter and the receiver, the feedback path coupled to a first frequency divider, the second fractional-N divide ratio of the second frequency synthesizer set to a fixed value based, at least in part, on a frequency divide number of the first frequency divider.

12. A method comprising:
   setting a first fractional-N divide ratio based on a selected channel; and
   setting a second fractional-N divide ratio to a fixed value that is sufficiently distant from an integer value so as to decrease fractional spurs and/or integer-N boundary spurs,
      the second fractional-N divide ratio set to a fixed value independent of the selected channel.

13. The method of claim 12 wherein: said setting a first fractional-N divide ratio comprises setting a first fractional-N divide ratio of a first frequency synthesizer in a wireless transceiver based on a selected channel; and said setting a second fractional-N divide ration comprises setting a second fractional-N divide ratio of a second frequency synthesizer in the wireless transceiver to a fixed value that is sufficiently distant from an integer value so as to decrease fractional spurs and/or integer-N boundary spurs for the wireless transceiver, the fractional-N divide ratio for the second frequency synthesizer set to a fixed value independent of the selected channel.

14. The method of claim 13 and further comprising: outputting a frequency or tone from the first frequency synthesizer; and outputting a modulated spectrum from the second frequency synthesizer.

15. The method of claim 12 wherein the setting the second fractional-N divide ratio comprises setting the second fractional-N divide ratio to a fixed value based, at least in part, on a frequency divide number for each of one or more frequency dividers.

16. A method comprising: selecting a channel for a wireless transceiver; setting a first fractional-N divide ratio of a first frequency synthesizer based on the selected channel; operating the wireless transceiver in a first mode of operation; setting, during the first mode of operation, a second fractional-N divide ratio of a second frequency synthesizer to a fixed value that is sufficiently distant from an integer value so as to decrease spurs for the wireless transceiver; and operating the wireless transceiver in a second mode of operation using the first and second fractional-N divide ratios for the first and second frequency synthesizers, respectively.

17. The method of claim 16 wherein the operating the wireless transceiver in a first mode of operation comprises operating the wireless transceiver in a calibration mode.

18. The method of claim 16 wherein the operating the wireless transceiver in a first mode of operation comprises operating the wireless transceiver in a calibration mode to calibrate a parameter for the wireless transceiver based on a loopback or feedback from a transmitter of the transceiver to a receiver of the transceiver.

* * * * *

UNITED STATES PATENT AND TRADEMARK OFFICE
CERTIFICATE OF CORRECTION

PATENT NO. : 7,653,359 B2
APPLICATION NO. : 11/336716
DATED : January 26, 2010
INVENTOR(S) : Hooman Darabi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 978 days.

Signed and Sealed this

Twenty-third Day of November, 2010

David J. Kappos
*Director of the United States Patent and Trademark Office*